United States Patent [19]
Sebastian

[11] Patent Number: 5,740,771
[45] Date of Patent: Apr. 21, 1998

[54] COMPUTER CONTROLLED INTAKE AND EXHAUST VALVE

[76] Inventor: Duane J. Sebastian, P.O. Box 97, Krum, Tex. 76249

[21] Appl. No.: 853,249

[22] Filed: May 9, 1997

[51] Int. Cl.$^6$ .................. F01L 9/02; F01L 9/04; F01L 1/44
[52] U.S. Cl. .................. 123/188.4; 123/188.16; 123/90.12
[58] Field of Search .................. 123/188.1, 188.16, 123/90.12, 90.11, 188.4

[56] References Cited

U.S. PATENT DOCUMENTS

| | | |
|---|---|---|
| 2,622,574 | 12/1952 | Butterworth . |
| 2,741,931 | 4/1956 | Sills .................. 123/188.4 |
| 3,299,869 | 1/1967 | Sicklesteel . |
| 3,875,921 | 4/1975 | Deboy et al. . |
| 4,159,704 | 7/1979 | Wiknich . |
| 4,164,209 | 8/1979 | Grants . |
| 4,790,272 | 12/1988 | Woolenweber .................. 123/188.4 |
| 5,022,357 | 6/1991 | Kawamura . |
| 5,124,598 | 6/1992 | Kawamura . |
| 5,125,370 | 6/1992 | Kawamura . |
| 5,190,262 | 3/1993 | Woollatt . |
| 5,193,495 | 3/1993 | Wood, III . |
| 5,199,394 | 4/1993 | Hartmann et al. . |
| 5,203,830 | 4/1993 | Faletti et al. . |
| 5,271,229 | 12/1993 | Clarke et al. . |
| 5,327,856 | 7/1994 | Schroeder et al. . |
| 5,517,951 | 5/1996 | Paul et al. . |
| 5,537,960 | 7/1996 | Izuo et al. . |
| 5,577,468 | 11/1996 | Weber . |

FOREIGN PATENT DOCUMENTS

| | | |
|---|---|---|
| 970490 | 9/1958 | Germany . |
| 2-308910 | 12/1990 | Japan . |
| 3-47415 | 2/1991 | Japan . |
| 111084 | 6/1918 | United Kingdom . |
| 1391955 | 4/1975 | United Kingdom . |

*Primary Examiner*—Erick R. Solis
*Attorney, Agent, or Firm*—Richard C. Litman

[57] ABSTRACT

A computer controlled intake and exhaust valve for internal combustion engines having a microprocessor controlled, hydraulically operated, valve actuator with manually adjustable variable performance settings for improving fuel efficiency and reducing emissions while also providing a high performance power stroke and lengthening the life of the valve seat by damping the impact of valve reseating. The computer controlled intake and exhaust valve includes a) a semi-automatic engine braking feature whereby the compression of exhaust gases within the chamber of a cylinder prior to venting is used to aid in reducing the speed of the vehicle, thus prolonging the life of the brakes and the safety of passengers, and b) notched and stepped valve seats which aid in retaining compression within the combustion chamber.

10 Claims, 4 Drawing Sheets

COMPUTER CONTROLLED INTAKE AND EXHAUST VALVE

BACKGROUND OF THE INVENTION

1. Field of the Invention

The present invention relates to intake and exhaust valves in piston driven internal combustion engines, particularly for use in an automotive vehicle. More specifically, the present invention relates to internal combustion engines having manually adjustable computer controlled performance curves.

2. Description of Related Art

An enormous quantity of fuel is consumed in the United States and throughout the world by internal combustion engines, particularly by internal combustion engines for use in automotive vehicles. Thus, it has long been recognized that improvements in the fuel efficiency of internal combustion engines for automotive vehicles are desirable.

The most popular type of air intake and exhaust valve used with internal combustion engines in automotive vehicles is the valve commonly known as the poppet valve. Fuel efficiency problems with the popper valve are well known. The following U.S. Patents show devices aimed at improving upon internal combustion engine inefficiencies caused by the poppet valve: No. 3,299,869, issued to Donald L. Sicklesteel on Jan. 24, 1967; No. 3,875,921, issued to Gail R. Deboy et al. on Apr. 8, 1975; No. 4,159,704, issued to Harold V. Wiknich on Jul. 3, 1979; No. 4,164,209, issued to William V. Grants on Aug. 14, 1979; Nos. 5,022,357, 5,124,598, and 5,125,370 issued to Hideo Kawamura on Jun. 11, 1991, Jun. 23, 1992 and Jun. 30, 1992 respectively; No. 5,190,262, issued to Derek Woollatt on Mar. 2, 1993; No. 5,193,495, issued to Charles D. Wood, III, on Mar. 16, 1993; and No. 5,577,468, issued to J. Roger Weber on Nov. 26, 1996. British Patent Numbers 111,084 and 1,391,955, published on Jun. 18, 1918 and Apr. 23, 1975 respectively, and German Patent Number 970,490, published on Sep. 15, 1958 show devices aimed at improving upon internal combustion engine inefficiencies caused by the poppet valve. Nevertheless, there remains a need for improved fuel efficiency in internal combustion engines.

Regardless of inefficiencies associated with the poppet valve, another specific problem associated with the poppet valve is that it cannot deliver a high performance power stroke. The following patents show devices that replace the popper valve with alternatives aimed at achieving a high performance power stroke from an internal combustion engine: U.S. Pat. No. 2,622,574, issued to Archibald J. Butterworth on Dec. 23, 1952 and Japanese Patent Numbers 2-308,910 and 3-47,415 published on Dec. 21, 1990 and Feb. 28, 1991 respectively. Nevertheless, there remains a need for improved efficiency in the power stroke of high performance internal combustion engines.

It is recognized in the art of internal combustion engines that alternative valve actuation means can eliminate the need for a rotating cam shaft and enable variable performance curves. U.S. Pat. Nos. 5,199,394, issued to Ume Hartmann et al. on Aug. 6, 1993, and 5,537,960, issued to Takashi Izuo et al. on Jul. 23, 1996 show such devices. A need for a valve actuation means that eliminates the need for a rotating cam shaft and enables variable performance curves still remains.

Other U.S. Patents less relevant to this invention include No. 5,203,830, issued to James J. Faletti et al. on Aug. 20, 1993; No. 5,271,229, issued to John M. Clarke et al. on Dec. 21, 1993; No. 5,327,856, issued to Thaddeus Schroeder et al. on Jul. 12, 1994; and No. 5,517,951, issued to Marius A. Paul et al. on Jul. 21, 1996.

Another problem commonly associated with internal combustion engines for automobiles is these engines emit pollutants into the surrounding atmosphere. Thus, an aspect of automobile engine design long recognized as desirable is a design change that lowers the level of unclean emissions from the automobile during engine combustion. Clarke '229, for example, mentions this problem and need.

None of the above described inventions show a microprocessor controlled, hydraulically operated, valve actuator with manually adjustable variable performance settings. Further, none of the above described inventions show a semi-automatic engine braking feature, or notched and stepped valve seats. These configurations improve fuel efficiency, passenger safety, valve life, valve cooling, and loss of valve compression, while providing a high performance power stroke at high revolutions per minute. Likewise, none of the above inventions and patents, taken either singularly or in combination, is seen to describe the instant invention as claimed. Thus, a computer controlled intake and exhaust valve solving the aforementioned problems is desired.

SUMMARY OF THE INVENTION

The present invention is a microprocessor controlled, hydraulically operated, intake and exhaust valve and valve actuator with manually adjustable variable performance settings. The present invention includes a semi-automatic engine braking feature, and notched and stepped valve seats.

Accordingly, the principal object of the invention is to improve fuel efficiency while also providing a high performance power stroke in an internal combustion engine by using a microprocessor with manually adjustable settings to vary the performance characteristics of the valve openings and the valve settings of the engine.

A related object of the invention is to minimize the loss of pressure in the compression chamber of an internal combustion engine.

Another related object of the invention is to flatten and expand the torque and horsepower curves that represent the performance of an internal combustion engine.

It is a further object of the invention to lengthen the life of the valve seat in an internal combustion engine by providing a damping effect when the valve reseats thus reducing wear on the valve seat.

It is yet another object of the invention to enable a smoother idle in an internal combustion engine that provides a high performance power stroke at high rates of revolutions per minute.

Still another object of the invention is to prolong the life of the brakes and the safety of passengers in a vehicle having an internal combustion engine by providing an engine braking feature whereby the compression of exhaust gases within the chamber of a cylinder prior to venting is used to aid in reducing the speed of the vehicle.

Further objects of the invention are to lower the weight of and reduce the emissions from an internal combustion engine.

It is an object of the invention to provide improved elements and arrangements thereof in a computer controlled intake and exhaust valve for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a computer controlled intake and exhaust valve for use with a piston driven internal combustion engine. This invention is a modification of a well-known piston driven internal combustion engine with poppet valves actuated by a contoured camshaft for the intake and exhaust valves to a piston cylinder. The present invention alters the functional design of the popper valve of the intake and exhaust valves and substitutes a different form and method of valve actuation for the fixed7 contoured cam shaft.

Figure 1:
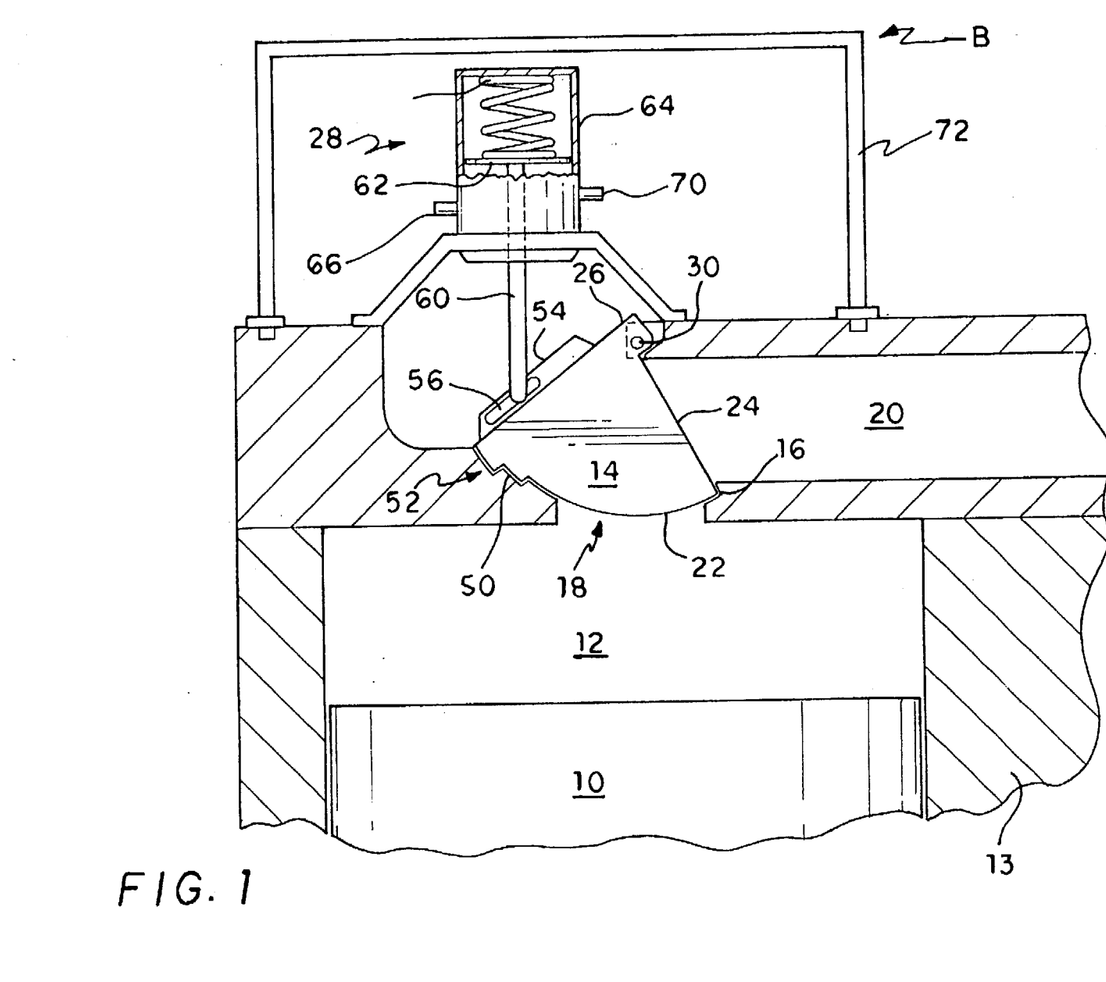
FIG. 1 is a partially fragmented cross-sectional view of an internal combustion engine with a computer controlled exhaust valve in the fully closed position according to the present invention.

Referring to FIG. 1, a piston 10 is pictured in a piston cylinder 12 defined by a cylinder block 13. The present invention will function properly in any arrangement known in the art for an internal combustion engine having a piston 10 in a cylinder 12 defined by a cylinder block 13, including gasoline and diesel fueled automobiles, trucks, airplanes, and helicopters. The preferred embodiment discussed below is described in use with a gasoline fueled automobile because it is believed that gasoline fueled automobiles represent the largest potential market for this invention. An exhaust valve 14 is shown seated in an exhaust valve seat 16 sealing an exhaust port 18, thus defining a closed position. When the exhaust port 18 is sealed, exhaust gases are prevented from escaping through an exhaust passage 20. Thus, exhaust gases are contained in the cylinder 12 when the exhaust valve 14 is seated in the exhaust valve seat 16 in the closed position. The exhaust valve seat 16 is a notched recess in the bottom of the exhaust passage 20.

The exhaust valve 14 has an exhaust port face 22, an exhaust passage face 24, and an exhaust actuator face 26; so called because the exhaust port face 22 faces the exhaust port 18, the exhaust passage face 24 faces the exhaust passage 20, and the exhaust actuator face 26 faces an exhaust valve actuator 28. At the junction of the exhaust passage face 24 and the exhaust actuator face 26, the exhaust valve 14 is pivotably attached to the top of the exhaust passage 20 by an exhaust valve pivot 30. The exhaust valve 14 rotates clockwise around an axis formed by the exhaust valve pivot 30 toward the exhaust valve actuator 28. An open position is defined when the exhaust valve 14 has rotated around the exhaust valve pivot 30 far enough to expose a portion of the exhaust port 18 to the exhaust passage 20, and a fully open position is defined when the exhaust valve 14 has rotated around the exhaust valve pivot 30 far enough to fully expose the exhaust port 18 to the exhaust passage 20. When in the open position, the extent to which the exhaust valve 14 has moved toward the fully open position defines the lift of the exhaust valve 14.

When the exhaust valve 14 is in the open position, exhaust gases in the cylinder 12 are free to pass through the exhaust port 18 into the exhaust passage 20 and subsequently into the ambient atmosphere. When the piston 10 is rising in the cylinder 12, exhaust gases in the cylinder are compressed. If the exhaust valve 14 is in the open position when the exhaust gases are compressed, then emission of the exhaust gases from the cylinder 12 through the exhaust port 18 and out of the exhaust passage 20 will take place. An airtight compression box 72 prevents any residual leakage of exhaust gases into the engine, thus insuring that all exhaust gases flow out of the exhaust passage 20. When the piston 10 has risen all the way to the top of the cylinder 12, then a top dead center position is defined. When the cylinder 12 has fallen all the way to the bottom (not shown) of the cylinder 12, then a bottom dead center position is defined.

Figure 2:
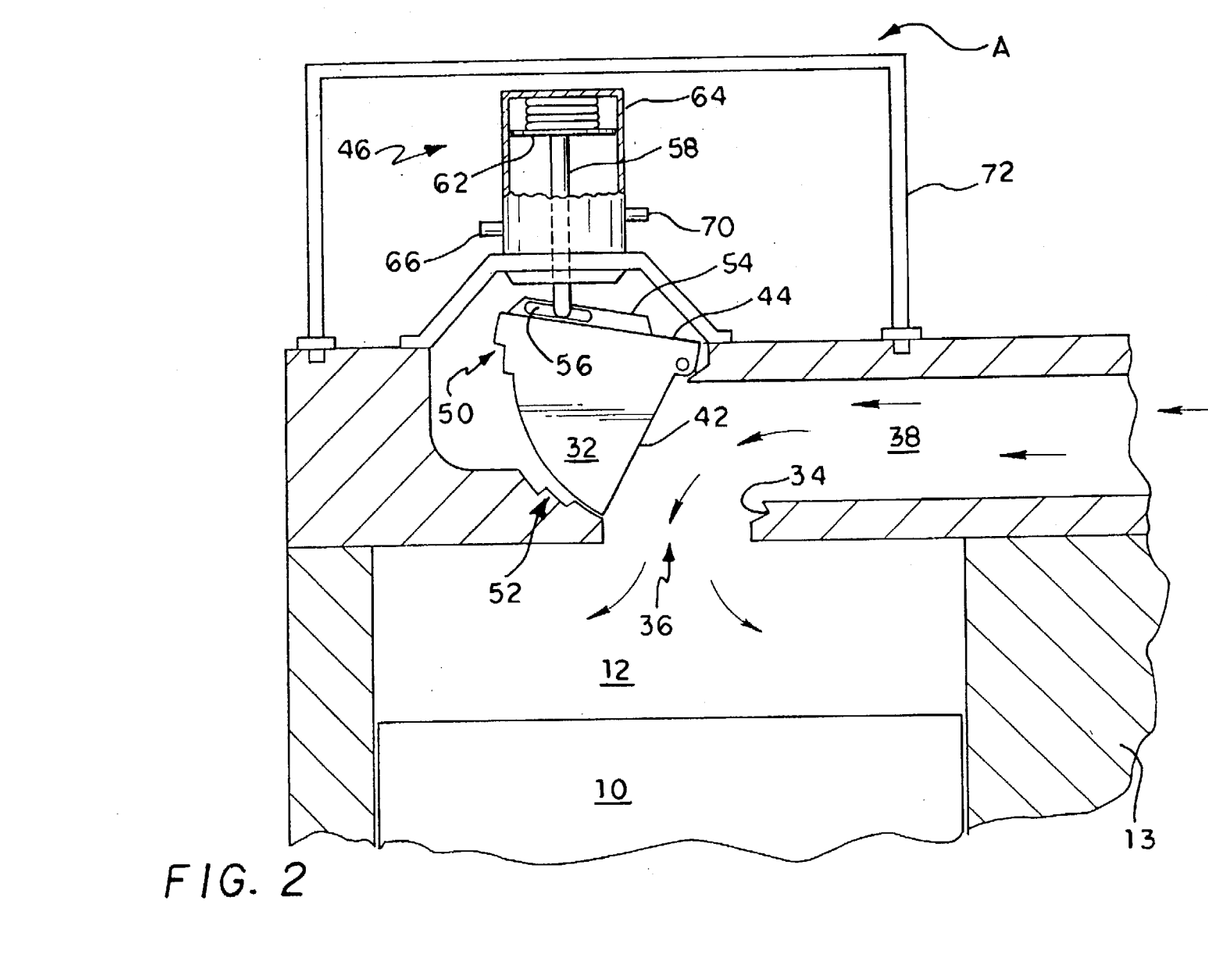
FIG. 2 is a partially fragmented cross-sectional view of an internal combustion engine with a computer controlled intake valve in the fully opened position according to the present invention.

Referring to FIG. 2, an intake valve 32 is shown, having an intake valve seat 34, an intake port 36, and an intake passage 38. A mixture of air and a fuel enters the cylinder 12 through the intake port 36 prior to combustion. Similar to the exhaust valve 14, the intake valve 32 has an intake port face 40 facing the intake port 36, an intake passage face 42 facing the intake passage 38, an intake actuator face 44 facing an intake valve actuator 46, and an intake valve pivot 48 by which the intake valve 32 is pivotably attached to the top of the intake passage 38. A closed position, an open position, and a fully open position are defined for the intake valve 32 corresponding to the positions defined for the exhaust valve 14. Thus, the intake valve 32 is shown in the fully open position. The exhaust valve 14 is similarly positioned when it is in the fully open position. Likewise, a cross-section of the intake valve in the closed position would look the same as FIG. 1.

Figure 3:
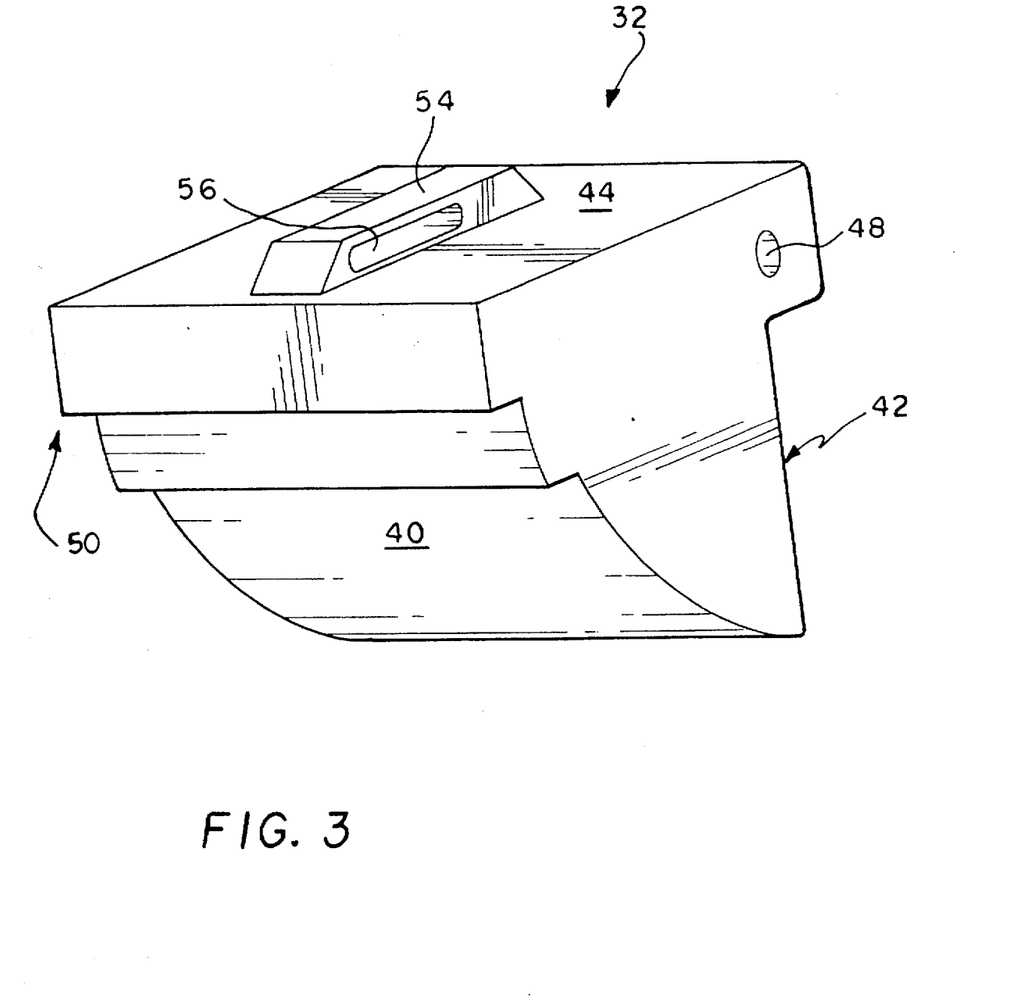
FIG. 3 is a perspective view showing a computer controlled intake valve according the present invention isolated from the other components of an internal combustion engine.

Referring to FIG. 3, the intake valve 32 is shown in perspective. The intake port face 40 ends in a stepped bevel 50 at the junction between the intake port face 40 and the intake actuator face 44. The stepped bevel 50 mates with a stepped seat 52 when the intake valve 32 is in the closed position. This design maintains compression in the cylinder 12 by making it more difficult for combustion gases to leak out of the cylinder 12 lowering the pressure in the cylinder 12. The preferred embodiment is shown with two steps in the stepped bevel 50 for the sake of simplicity. It is believed that a single step or a number of steps greater than two in the stepped bevel 50 would also reduce the loss of compression in the cylinder 12. Like the exhaust valve seat 16, the intake valve seat 34 is a notched recess in the bottom of the intake passage 38. As with the stepped bevel 50, the notched exhaust valve seat 16 and the notched intake valve seat 34 aid in maintaining air pressure in the cylinder 12 when the intake valve 32 and the exhaust valve 14 are in the closed position, thus slowing the loss of compression.

The intake port face 40 is linear along a plane that parallels the intake valve pivot 48 and curvilinear from the stepped bevel 50 to its junction with the intake passage face 42. The intake passage face 42 is planar from the intake valve pivot 48 to its junction with the intake port face 40. The intake actuator face 44 is also planar. Thus, the intake passage 38 has a rectangular cross section, and the intake port 36 is rectangular.

In the center of the intake actuator face 44 is a stem connector 54. The stem connector 54 is slightly raised from the intake actuator face 44 defining a stem slit 56. Referring to FIG. 2, an intake valve stem 58 is shown slidably connected to the intake valve stem connector 54 at the stem slit 56.

Referring again to FIG. 1, the exhaust valve 14 has a stepped bevel 50 and a stepped seat 52 identical to the intake valve 32. When the intake valve 32 is in the closed position, it looks identical to the exhaust valve 14 pictured. Thus, the exhaust passage 20 has a rectangular cross section identical to the intake passage 38, and the exhaust port 18 is the same rectangular shape as the intake port 36. The exhaust valve 14 has a stem connector 54 and a stem slit 56 situated on the exhaust actuator face 26 in exactly the same manner that the stem connector 54 and stem slit 56 are situated on the intake actuator face 44.

An exhaust valve stem 60 is slidably connected to the stem slit 56 and fixably attached to a hydraulic piston 62 inside a hydraulic valve 64. To open the exhaust valve 14, high pressure hydraulic fluid is supplied to the hydraulic piston 62 through an inlet port 66 in the hydraulic valve 64. This forces the hydraulic piston 62 to rise in the hydraulic valve 64 also pulling up the exhaust valve stem 60 and the exhaust valve 14. When the hydraulic fluid pressure is released, a biasing means, namely spring 68, forces the hydraulic piston 62 back down the hydraulic valve 64 pushing the exhaust valve stem 60 and the exhaust valve 14 down with it. As the hydraulic piston 62 drops, hydraulic fluid vents through an outlet port 70 in the hydraulic valve 64.

The use of the hydraulic valve 64 also dampens the reseating of the exhaust valve 14 as it reaches the closed position. This damping effect is due to the use of the hydraulic fluid. The use of the hydraulic fluid reduces the force of impact when the exhaust valve 14 reseats in turn extending the life of the exhaust valve 14 by reducing the rate of deterioration of the quality of the airtight seal when the exhaust valve 14 is in the closed position. The mechanical operation of the intake valve actuator 46 is substantially identical to the operation of the exhaust valve actuator 28 just described.

Further, the use of hydraulic fluid to actuate the exhaust valve actuator 28 and the intake valve actuator 46 eliminates the need for a cam shaft in the internal combustion engine. Two significant benefits are obtained by eliminating the cam shaft from the internal combustion engine.

First, elimination of the cam shaft enables the performance characteristics of the engine to be varied. When used in an internal combustion engine, the cam shaft controls the opening and closing of the intake valve and the exhaust valve. The cam shaft is metal and has a fixed contour. Thus, the pattern of the program by which the intake valve and the exhaust valve travel from the fully open position to the closed position does not change in an engine with a cam shaft. Second, the cam shaft is a heavy part. By eliminating the cam shaft and associated parts such as lifters, push rods, and rocker arms from the engine, the gross weight of the engine is significantly reduced, thereby increasing the fuel efficiency of the vehicle, because any given amount of fuel will propel a lighter vehicle farther than it will propel a heavier vehicle.

Figure 4:
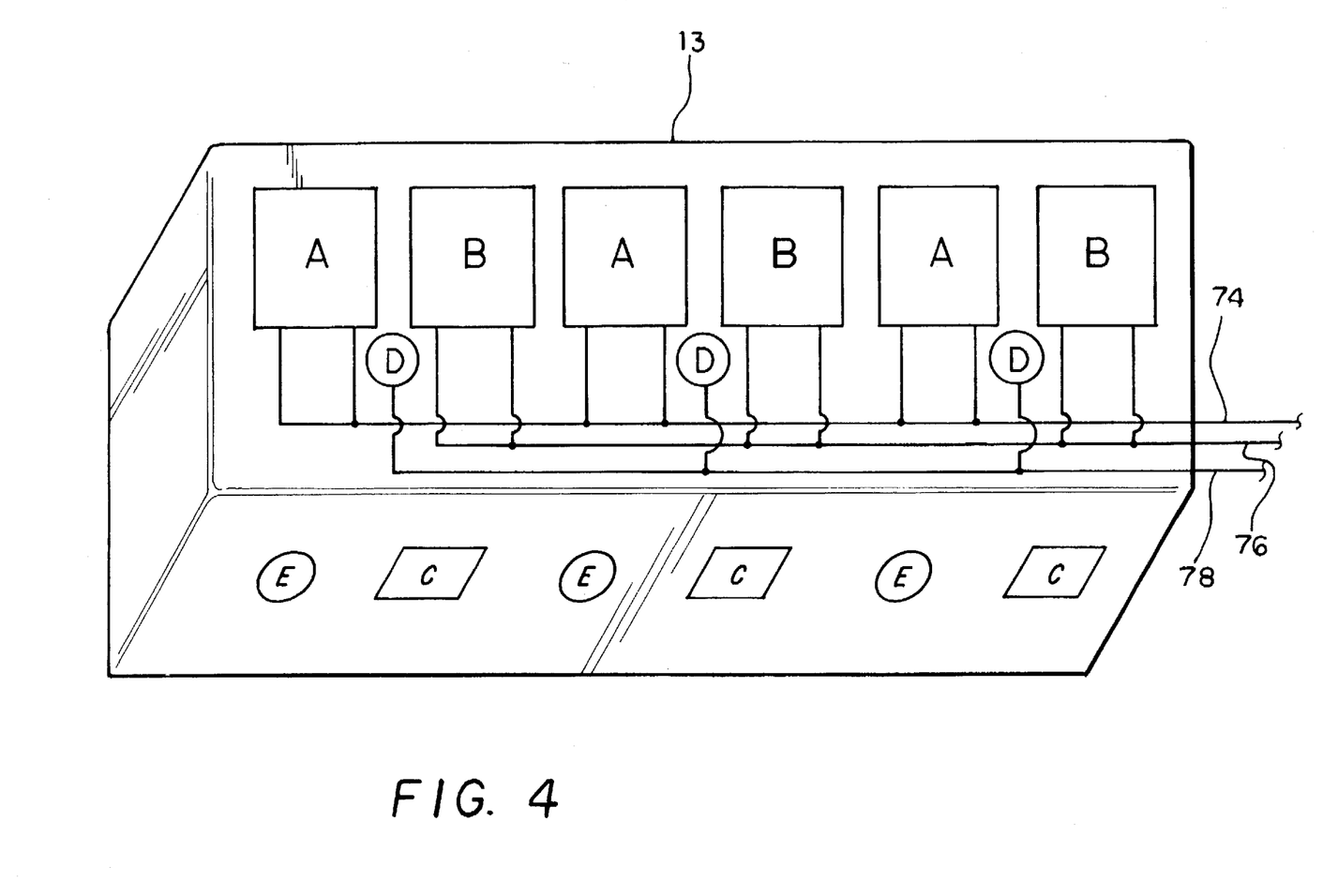
FIG. 4 is a schematic view showing an embodiment of the physical and electrical relationships between a plurality of computer controlled intake and exhaust valves and the other components of an internal combustion engine.

Referring now to FIG. 4, a cylinder block 13 with three cylinders is shown. A schematic block diagram is superimposed on the cylinder block 13 to show the physical orientation of various mechanical components of a piston driven internal combustion engine and the electrical connections between the mechanical components and the electrical components of the invention.

A computer controlled intake valve A is paired with a computer controlled exhaust valve B for each cylinder 12. Between each pair of a computer controlled intake valve A and a computer controlled exhaust valve B is a fuel injector D. The fuel injector D controls the distribution of the fuel through the intake port 36 into the cylinder 12. Each cylinder 12 requires a spark plug E to ignite the fuel mixture that enters the cylinder 12 through the intake port 36. Each exhaust passage 20 exits the cylinder block 13 through an exhaust orifice C. Typically, after exiting the cylinder block 13 through the exhaust orifice C, exhaust gases pass into a system of exhaust pipes (not shown).

An electronic control means (not shown) sends an electronic signal to an electronic actuator (not shown) to operate each computer controlled intake valve A. In the preferred embodiment, the electronic control means is a microprocessing computer as is known in the art. An intake control line 74 carries the electronic signal from the computer to the electronic actuator. The intake control line is any suitable electrical conductor known in the art. When activated by the electronic signal from the computer, the electronic actuator opens a hydraulic fluid supply line (not shown) coupled with the inlet port 66 sending pressurized hydraulic fluid to the inlet port 66, thus activating the intake valve actuator 46 and moving the intake valve 32 to the open position as described above. To close the intake valve 32, the computer discontinues the electronic signal through the intake control line 74. This deactivates the electronic actuator, in turn closing off the supply of pressurized hydraulic fluid to the inlet port 66 through the hydraulic fluid supply line and moving the intake valve 32 to the closed position as described above. In the preferred embodiment, the electronic actuator is a solenoid valve as is commonly known in the art. Thus, by altering the period of time that the electronic signal is activating the electronic actuator, different program settings vary the magnitude and duration of the lift on the intake valve 32 in a way that cannot be achieved by a cam shaft.

The micro-processing computer also sends an electronic signal to an electronic actuator (not shown) to operate each computer controlled exhaust valve B. An exhaust control line 76 carries the electronic signal from the computer to the electronic actuator. Like the intake control line 74, the exhaust control line 76 is an electrical conductor as is known in the art. The function of the electronic signal in the exhaust control line 76 is identical to the function of the electronic signal in the intake control line. That is, when activated by the electronic signal from the computer, the electronic actuator opens a hydraulic fluid supply line (not shown) coupled with the inlet port 66 sending pressurized hydraulic fluid to the inlet port 66, thus activating the exhaust valve actuator 28 and moving the exhaust valve 14 to the open position. To close the exhaust valve 14, the computer discontinues the electronic signal through the exhaust control line 76. This deactivates the electronic actuator in turn closing off the supply of pressurized hydraulic fluid to the inlet port 66 through the hydraulic fluid supply line and moving the exhaust valve 14 to the closed position. Thus, by altering the period of time that the electronic signal is activating the electronic actuator, different program settings vary the magnitude and duration of the lift on the exhaust valve 14 in a way that cannot be achieved by a cam shaft.

The timing and amount of fuel injected through the intake port 36 by the fuel injector D is also controlled by an electronic signal from the micro-processing computer. To control fuel injection, the computer sends the electronic signal to an electronic actuator (not shown) through a fuel injection control line 78. The fuel injection control line 78 is also an electrical conductor as is known in the art. The supply of fuel is released when the electronic actuator opens a fuel supply line (not shown) sending fuel to the inlet port 66. To discontinue the supply of fuel to the inlet port 66, the computer discontinues the electronic signal through the fuel injector control line 78. This deactivates the electronic actuator which in turn closes off the supply of fuel through the fuel supply line.

The electronic control means, preferably a microprocessing computer, selectively activates and deactivates the electronic signal through the intake control line 74, the exhaust control line 76, and the fuel injection control line 78, according to a program. The program is variable and is manually set and manually adjustable. Using an automobile having a dashboard, an accelerator pedal, and a brake pedal to illustrate the preferred embodiment, a performance switch is installed in the dashboard of the automobile within reach of a driver. In the preferred embodiment, the performance switch has three settings.

The first setting on the performance switch in the preferred embodiment is a fuel efficiency setting. When the performance switch is in the fuel efficiency setting, the computer is set to a program that will operate the intake valve 32 and the exhaust valve 14 in a manner that will consume the least amount of fuel per unit of distance traveled regardless of the amount of power the engine produces. In other words, when the performance switch is set to the fuel efficiency setting, the program will operate the automobile to travel the most miles per gallon of fuel consumed, but will provide a low level of accelerating power.

An alternative setting on the performance switch in the preferred embodiment is a high performance setting. When the driver sets the performance switch to the high performance setting, the computer is set to a program that will operate the intake valve 32 and the exhaust valve 14 to produce the highest level of power that the engine can produce, regardless of the amount fuel the engine consumes in the process. In other words, when the performance switch is set to the high performance setting, the program will operate the automobile to travel relatively few miles per gallon of fuel consumed, but will provide the highest level of accelerating power that the engine can produce.

The accelerating power of an internal combustion engine in an automobile is commonly represented by a torque curve and a horsepower curve. Both curves graphically represent an aspect of the accelerating power of the engine along a vertical y-axis relative to revolutions per minute of the engine, linearly laid out along an horizontal x-axis. The torque curve uses an angular force such as foot-pounds for the units on the y-axis. The horsepower curve uses a measure of power output such as horsepower for the units on the y-axis. In the typical internal combustion engine with a cam shaft, the torque curve and horsepower curve are a bell curve with a relatively thin spike in the center. An engine that raises the height, widens the thickness, or flattens the top of the torque or horsepower curve is more powerful than an engine whose performance curves resemble the typical curves. When the performance switch is set to the high performance setting, the torque curve and horsepower curve of the engine will be higher, wider, and flatter.

A normal setting is provided between the fuel efficiency setting and the high performance setting of the performance switch in the preferred embodiment. When the driver sets the performance switch to the normal setting, the computer is set to a program that will operate the intake valve 32 and the exhaust valve 14 according to the high performance setting when the accelerator pedal is fully depressed and the engine is at its maximum acceleration, according to the fuel efficiency setting when the acceleration of the engine is at or below zero, and graduate the characteristics between these two extremes when the acceleration of the engine is between zero and its maximum. Thus, when the performance switch is set to normal, the program a) produces the highest level of power that the engine can produce when the acceleration of the engine is at its maximum, b) operates the engine to obtain the most miles per gallon of fuel consumed when the acceleration of the engine is at or below zero, and c) gradually increases the power and gradually decreases the distance travelled per unit of fuel consumed as the acceleration of the vehicle increases from zero to its maximum.

Automobiles with high performance curves are known in the art. However, the engine in such automobiles runs very roughly when it is idling. Additionally, automobiles with high performance curves known in the art today discharge high levels of pollutants into the atmosphere when idling. The normal setting improves upon such automobiles by providing high performance from the automobile when high performance is needed the most, at maximum acceleration, yet also providing a smooth idle with much cleaner exhaust.

In an alternative embodiment, a performance dial is substituted for the performance switch. The performance dial has a counter-clockwise rotational limit and a clockwise rotational limit. When the performance dial is at the counter-clockwise rotational limit, then the computer is set to a program that will operate the intake valve 32 and the exhaust valve 14 according to the fuel efficiency setting for the performance switch of the preferred embodiment described above, thus defining a fuel efficiency program. When the performance dial is at the clockwise rotational limit, then the computer is set to a program that will operate the intake valve 32 and the exhaust valve 14 according to the high performance setting for the performance switch described above, thus defining a high performance program. When the performance dial is halfway between the counter-clockwise rotational limit and the clockwise rotational limit, thus defining a mid-point, then the computer is set to a program that will operate the intake valve 32 and the exhaust valve 14 according to the normal setting for the performance switch of the preferred embodiment described above, thus defining a normal program.

For settings of the performance dial between the counter-clockwise rotational limit and the mid-point, as the dial moves clockwise from the counter-clockwise rotational limit to the mid-point, the quantum of acceleration below which the computer is set to the fuel efficiency program gradually moves from the maximum acceleration of the engine to zero.

Then, for settings of the performance dial between the mid-point and the clockwise rotational limit, as the dial moves clockwise from the mid-point to the clockwise rotational limit, the quantum of acceleration above which the computer is set to the high performance program gradually moves from the maximum acceleration of the engine to zero.

By enabling variable performance curves of the vehicle, the computer controlled intake valve A and the computer controlled exhaust valve B also enable better control of the levels of pollutants of the exhaust gases passing through the exhaust orifice C and subsequently into the environment. Variable performance curves enable a cleaner burn of the mixture of the air and the fuel, thus making the exhaust gases cumulatively cleaner than they are in an engine that is limited to a single set of performance curves.

The typical internal combustion engine operates with a four stroke cycle known as the Otto-cycle. During the first stroke, the intake valve 32 is in the open position and the piston 10 moves from the top dead center position toward the bottom of the cylinder 12 while the mixture of the fuel and the air enters the cylinder 12 through the intake port 36. This stroke defines an intake stroke. The second stroke of the Otto-cycle is known as a compression stroke. During the compression stroke the piston 10 rises in the cylinder 12 with both the intake valve 32 and the exhaust valve 14 in the closed position, compressing the mixture of the fuel and the air in the cylinder 12. Then, during a stroke known as a combustion stroke, combustion of the mixture takes place forcing the piston 10 back down toward the bottom of the cylinder 13 while the intake valve 32 and the exhaust valve 14 are in the closed position. Finally, during an exhaust stroke, the exhaust valve 14 opens and the piston 10 rises in the cylinder 12 forcing exhaust out of the cylinder 12 into the exhaust passage 20 through the exhaust port 18.. The fuel efficiency program, the normal program, and the high performance program all operate with this Otto-cycle.

An alternative embodiment incorporates a variation of the Otto-cycle for use in any of the above embodiments when the computer is set to the fuel efficiency program in an engine that has more than one cylinder 12. In this alternative embodiment, the program shuts down a number of cylinders 12 less than or equal to one half of the total number of cylinders 12 in use in the engine. To shut down a cylinder 12, the program discontinues the electronic signal to the fuel injector D, thus shutting off the supply of fuel to the intake valve 32. When shutting down a cylinder 12, the program also opens the intake valve 32 every time the piston 10 reaches the top dead center position, thus allowing cooler, fresh air to flow into the cylinder 12 through the intake passage 38. This helps to cool the engine, thus reducing the load on other components of the engine designed to cool the engine, such as the water pump.

When the piston 10 reaches the bottom dead center position in this embodiment of the fuel efficiency program for multi-cylinder 12 engines, the program closes the intake valve 32 and opens the exhaust valve 14. This prevents any pressure from building up in the cylinder 12 as the piston 10 rises from the bottom dead center position to the top dead center position. Thus, there will be little resistance on the cylinder(s) 12 that are still operating normally from the cylinder(s)12 that are shut down.

Another alternative embodiment of the invention incorporates an engine brake feature. In this embodiment, an engine brake switch having an on position and an off position is mounted in the dashboard of the vehicle. When the engine brake switch is in the on position, the program disengages the electronic signal to the electronic actuator for the exhaust valve 14 during the exhaust stroke, thus keeping the exhaust valve 14 in the closed position during the exhaust stroke. This causes compression to build up inside the cylinder 12 during the exhaust stroke. The build up of pressure slows the engine down, thus assisting the mechanical braking of the vehicle to reduce the velocity of the vehicle. When the engine brake switch is in the on position, the program opens the exhaust valve 14 allowing the exhaust gas to pass through the exhaust port 18 after the piston 12 reaches the top dead center position. If the accelerator pedal is depressed while the engine brake switch is in the on position, then the computer will disengage the engine brake feature until the accelerator is completely released.

Many automobiles produced today have a sensor that generates an electronic control signal indicating the position of the accelerator pedal and the brake pedal. In the preferred embodiment of the invention, these electronic control signals are sent to the computer in parallel with the other parts of the automobile for which they were generated. Many automotive vehicles used today also have an anti-lock brake feature which engages when the electronic control signal from the brake pedal reaches a predetermined threshold. In a vehicle possessing the engine brake feature that also has anti-lock brakes, the engine brake feature is engaged whenever the anti-lock brakes are engaged, even if the engine brake switch is in the off position.

By aiding the mechanical brakes in a vehicle, the engine brake feature reduces the wear on the mechanical brakes, thus extending their life. By assisting in reducing the velocity of the vehicle during braking, the engine brake switch also makes the vehicle safer for passengers.

It is to be understood that the present invention is not limited to the embodiments described above, but encompasses any and all embodiments within the scope of the following claims.

I claim:

1. A computer controlled intake and exhaust valve for a piston driven internal combustion engine for propelling a vehicle, the engine having a torque curve and a horsepower curve to graphically represent the performance of the engine, the computer controlled intake and exhaust valve comprising:

a) a cylinder block with a piston cylinder having a top and a bottom and a reciprocable piston disposed in the cylinder, the piston positioned in its extreme positions in a top dead center position at the top of the cylinder and in a bottom dead center position at the bottom of the cylinder;

b) an intake passage with an intake port to the cylinder for taking in a mixture of air and a fuel prior to combustion, and an exhaust passage with an exhaust port to the cylinder for emitting exhaust fumes subsequent to combustion, the intake passage and the exhaust passage having a polygonal cross-section, the intake port and the exhaust port being polygonally shaped and being at the top of the cylinder;

c) an intake valve having a passage face being planar, a port face being curvilinear across one axis and linear across another axis, the curvilinear axis of the port face forming a right angle with the passage face, and an actuator face being substantially planar and having a junction with the passage face and a junction with the port face, the junction with the passage face forming a right angle and being pivotably attached to the intake passage opposite the intake port, the junction with the port face having a bevel;

d) an intake valve seat being defined by the intake passage at the intake port and conforming to the contours of the junction between the passage face of the intake valve and the port face of the intake valve, a closed position being defined when the intake valve is seated flush with the intake valve seat;

e) an exhaust valve having a passage face being planar, a port face being curvilinear across one axis and linear across another axis, the curvilinear axis of the port face forming a right angle with the passage face, and an actuator face being substantially planar and having a junction with the passage face and a junction with the port face, the junction with the passage face forming a right angle and being pivotably attached to the exhaust passage opposite the exhaust port, the junction with the port face having a bevel;

f) an exhaust valve seat being defined by the exhaust passage at the exhaust port and conforming to the contours of the junction between the passage face of the exhaust valve and the port face of the exhaust valve, a closed position being defined when the exhaust valve is seated flush with the exhaust valve seat;

g) an intake valve stem being pivotally attached to the actuator face of the intake valve;

h) an exhaust valve stem being pivotally attached to the actuator face of the exhaust valve;

i) a biasing means for biasing the intake valve to close against the intake valve seat, and a biasing means for biasing the exhaust valve to close against the exhaust valve seat;

j) an intake valve actuator having an inlet port, an outlet port for outflow of hydraulic fluid when the spring means is closing the intake valve, and an electronic actuator coupled to a hydraulic valve means having a displaceable hydraulic piston in engagement with the spring means and in engagement with the intake valve stem for displacement of the intake valve on electronic activation of the electronic actuator, thus defining an open position, wherein the electronic actuator comprises a means for supplying pressurized hydraulic fluid to the inlet port upon actuation by an electronic signal;

k) an exhaust valve actuator having an inlet port, an outlet port for outflow of hydraulic fluid when the spring means is closing the exhaust valve, and an electronic actuator coupled to a hydraulic valve means having a displaceable hydraulic piston in engagement with the spring means and in engagement with the exhaust valve stem for displacement of the exhaust valve on electronic activation of the electronic actuator, thus defining an open position, wherein the electronic actuator comprises a means for supplying pressurized hydraulic fluid to the inlet port upon actuation by an electronic signal;

l) an electronic control means for selective activation of the exhaust valve actuator and the intake valve actuator in accordance with a program; and, m) a sealing means for maintaining an air-tight seal at the intake passage, the exhaust passage, and the cylinder.

2. The computer controlled intake and exhaust valve as defined in claim 1 wherein the electronic control means is a micro-processing computer.

3. The computer controlled intake and exhaust valve as defined in claim 2 wherein the electronic control means controls the frequency and duration with which the electronic actuator is activated and controls the proportions of the air and the fuel in the mixture taken in through the intake port.

4. The computer controlled intake and exhaust valve as defined in claim 3 further comprising a manually adjustable dial for controlling the program.

5. The computer controlled intake and exhaust valve as defined in claim 3 further comprising a manually adjustable switch with a plurality of discrete control settings for controlling the program.

6. The computer controlled intake and exhaust valve as defined in claim 5 wherein the plurality of discrete control settings is three.

7. The computer controlled intake and exhaust valve as defined in claim 6 further comprising:

a) a high performance setting for setting the program to deliver the mixture of the air and the fuel producing the highest possible torque curve and the highest possible horsepower curve, b) a fuel efficiency setting for setting the program to deliver the mixture of the air and the fuel producing the lowest possible consumption of fuel per unit of distance traveled by the vehicle being powered by the engine, and c) a normal setting for setting the program to the fuel efficiency setting when the acceleration of the vehicle is at or be low zero, the performance setting when the acceleration of the vehicle is at its maximum, and graduating the relative amount of the air and the fuel in the mixture between the fuel efficiency setting and the performance setting when the acceleration of the vehicle is between its maximum and zero.

8. The computer controlled intake and exhaust valve as defined in claim 7 further comprising a plurality of piston cylinders and a plurality of reciprocable pistons wherein the program selectively sets to zero the fuel in the mixture to a number of valves when the control setting is in the fuel efficiency setting, thus defining a shut down valve, the number of valves being shut down by the program not exceeding the number of valves being operated normally by the program, the program fully opening the intake valve and fully closing the exhaust valve when the piston is in the top dead center position and fully closing the intake valve and fully opening the exhaust valve when the piston is in the bottom dead center position.

9. The computer controlled intake and exhaust valve as defined in claim 3 further comprising a manually actuated switch for activating an engine brake feature whereby the program keeps both the intake valve and the exhaust valve in the closed position when the piston is rising from the bottom dead center position to the top dead center position and opens the exhaust valve when the piston reaches the top dead center position.

10. The computer controlled intake and exhaust valve as defined in claim 3 wherein the vehicle is an automotive vehicle having an accelerator being a foot pedal for accelerating the vehicle when increasing pressure is applied to the accelerator and a brake being a foot pedal for decelerating the vehicle when pressure is applied to the brake and, wherein further the automotive vehicle further comprises:

a) an antilock braking feature that is activated when the pressure applied to the brake exceeds a predetermined threshold, and b) a manually actuated switch for activating an engine brake feature when no pressure is on the accelerator whereby the program keeps both the intake valve and the exhaust valve in the closed position when the piston is rising from the bottom dead center position to the top dead center position and opens the exhaust valve when the piston reaches the top dead center position, the computer automatically activating the engine break feature when the antilock brake feature is activated, and the computer automatically deactivating the engine break feature when pressure is applied to the accelerator.

* * * * *